United States Patent [19]
Matsukura et al.

[11] Patent Number: 5,633,065
[45] Date of Patent: May 27, 1997

[54] LAMINATE RESIN PRODUCT

[75] Inventors: Yoshihiro Matsukura; Takahisa Ueyama, both of Niihari-gun, Japan

[73] Assignee: Kureha Kagaku Kogyo Kabushiki Kaisha, Tokyo, Japan

[21] Appl. No.: 531,065

[22] Filed: Sep. 20, 1995

[30] Foreign Application Priority Data

Sep. 21, 1994 [JP] Japan ................... 6-251629

[51] Int. Cl.⁶ .................................. B32B 5/12
[52] U.S. Cl. ........................... 428/112; 428/105
[58] Field of Search ..................... 428/112, 105

[56] References Cited

U.S. PATENT DOCUMENTS

| | | | |
|---|---|---|---|
| 3,565,744 | 2/1971 | Rasmussen | 161/112 |
| 4,075,379 | 2/1978 | Lloyd | 428/105 |
| 4,368,017 | 1/1983 | Rasmussen | 425/131.1 |
| 4,575,470 | 3/1986 | Fakiron et al. | 428/105 |
| 4,784,594 | 11/1988 | Sharps, Jr. | 425/131.1 |

FOREIGN PATENT DOCUMENTS

| | | |
|---|---|---|
| 0122703 | 10/1984 | European Pat. Off. |
| 0189270 | 7/1986 | European Pat. Off. |
| 0323043 | 7/1989 | European Pat. Off. |
| 0435791 | 7/1991 | European Pat. Off. |
| 0594530 | 4/1994 | European Pat. Off. |
| WO87/05856 | 10/1987 | WIPO |

*Primary Examiner*—Daniel Zirker
*Attorney, Agent, or Firm*—Wenderoth, Lind & Ponack

[57] ABSTRACT

A laminate resin film having two major surfaces is constituted by plural resin species. In the laminate, layers of the plural resin species are laminated obliquely to the two major surfaces in at least one section perpendicular to the two major surfaces, and each layer of the plural species of resins is exposed to the two major surfaces. The laminate resin film has equivalent properties in the thickness direction (such as gas-barrier property) as in a conventional laminated film but has properties in the planar extension direction which are remarkably affected by properties (such as low Young's modulus and heat-shrinkability) of a certain component resin layer.

13 Claims, 5 Drawing Sheets

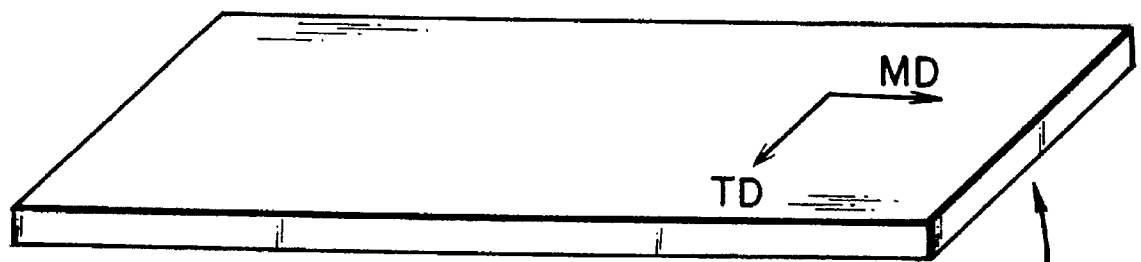
FIG. IA
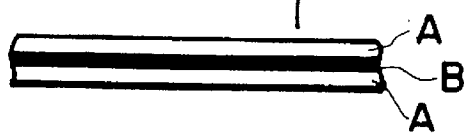
FIG. IB
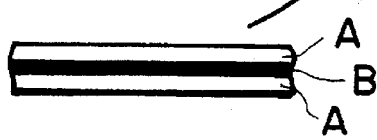
FIG. IC

LAMINATE RESIN PRODUCT

FIELD OF THE INVENTION AND RELATED ART

The present invention relates to a laminate resin product in the form of a sheet or a film.

Formation of a composite sheet or film (hereinafter inclusively referred to as a "film" without intending to limit the thickness thereof) comprising plural species of resins has been widely practiced to provide a resin film with a property which cannot be attained by a single species of resin. Typical examples of such a composite film include a single-layered film of a mixture of plural resin species and a laminate film of layers of plural resin species. The properties of the resultant composite film may be intermediate those of the component resins (or resin films) in most cases while they can depend on the manner of mixture and lamination. For example, a conventional laminate resin film including plural component resin layers each extending uniformly from one edge to the other shows an intermediate property of those of the component resin layers in the planar extension direction in most cases. This may be satisfactory in many cases but, in some cases, it is desirable to provide a composite film having properties including a property of a component resin in a more emphatic manner.

SUMMARY OF THE INVENTION

In view of the above-mentioned circumstances, a principal object of the present invention is to provide a laminate resin product noticeably retaining the properties of individual resin layers in some respect.

A more specific object of the present invention is to provide a laminate resin product in the form of a film, of which the property in a thicknesswise direction is identical to that of an ordinary laminate film but the property in a planar extension direction is affected more noticeably with individual properties of the component resin layers.

A further object of the present invention is to provide a laminate resin product in the form of a film which has smaller Young's modulus and yield stress and a larger deformability than those of an ordinary laminate film in a planar extension direction.

A more specific object of the present invention is to provide a laminate resin product in the form of a film having a surface pattern including stripes of different surface properties.

Another specific object of the present invention is to provide a laminate resin product in the form of a film having a good gas-barrier property and a large deformability in combination.

According to the present invention, there is provided a laminate resin product, comprising plural resin species and having two major surfaces, wherein layers of said plural resin species are laminated obliquely to the two major surfaces in at least one section perpendicular to the two major surfaces, and each layer of said plural resin species is exposed to the two major surfaces.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1A is a perspective view of a conventional laminate resin film, and FIGS. 1B and 1C are schematic views, of an MD section and a TD section, respectively, of the resin film.

DESCRIPTION OF THE PREFERRED EMBODIMENTS

FIGS. 1A, 1B and 1C are a schematic perspective view, a partial sectional view in an MD direction parallel to a forming or extrusion axis, and a partial sectional view in a TD direction perpendicular to the forming or extrusion axis, respectively, of a conventional laminate resin film, wherein the component resin layers A and B uniformly extend to the edges in parallel to the two major surfaces both in the MD and TD directions.

Figure 2A:
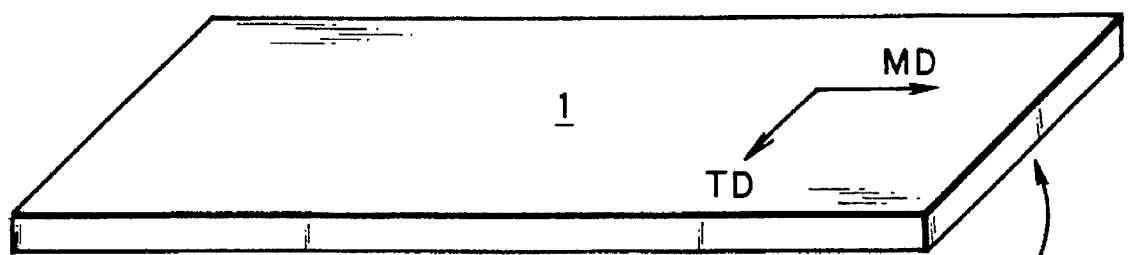
FIG. 2A is a perspective view of a laminate resin film prepared according to an embodiment of the method of the present invention.
Figure 2B:
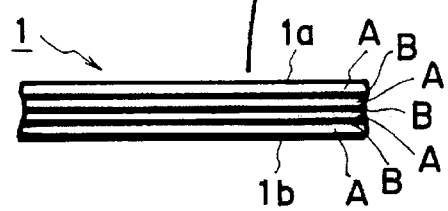
FIGS. 2B and 2C are schematic views, of an MD section and a TD section, respectively, of the resin film.
Figure 2C:
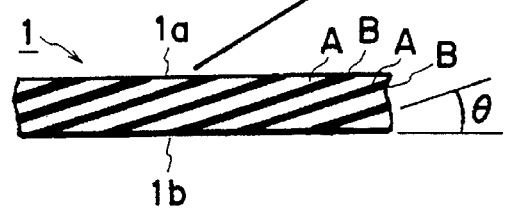

In contrast thereto, FIGS. 2A, 2B and 2C are a schematic sectional view, a partial sectional view in an MD direction and a partial sectional view in a TD direction, respectively, of a laminate resin film 1 as an embodiment of the laminate resin product according to the present invention prepared by using a spiral die in a preferred example of process for producing the laminate resin film. As is clear from FIGS. 2B and 2C, the laminate resin film 1 has an MD section showing the resin layers A and B laminated alternately and parallel to the two major surfaces (FIG. 2B) but has a TD section showing the resin layers A and B laminated alternately and obliquely so that the respective resin layers A and B reach the two major surfaces $1a$ and $1b$ of the laminate resin film 1 (FIG. 2C). The individual resin layers A and B form with respect to the two major surfaces $1a$ and $1b$ an angle θ, which however is not so large as shown in FIG. 2C but may be in the range of larger than 0 deg. and at most 4 deg., particularly 0.001–0.4 deg. The angle θ may be calculated according to the following equation:

tanθ=[film thickness (mm)]/[whole peripheral length of the tubular film (mm) × spreading angle (ωdeg.)/360 deg.]

(The spreading angle ω will be described hereinafter.)

As a result of such a characteristic obliquely laminated structure, the laminate resin film obtained according to the method of the present invention has properties in its thickness direction (such as compressibility, gas barrier characteristic, etc.) which are equivalent to those of a conventional parallel lamination-type but properties in a direction of planar extension, particularly in the TD direction, which are preferentially governed by one of the component resins showing a smaller mechanical property, such as Young's modulus or yield stress, and include a larger degree of deformability as a whole. These properties may be suited for deep drawing, skin forming or packaging, etc. Further, it has been confirmed that a stretched film obtained by uniaxially or biaxially stretching the obliquely laminate resin film shows a high shrinkability and a small Young's modulus. These properties lead to a tight-fitting characteristic and a low-temperature shrinkability which are desirable when the stretched film is used, e.g., as a vacuum packaging material for foods.

Figure 2D:
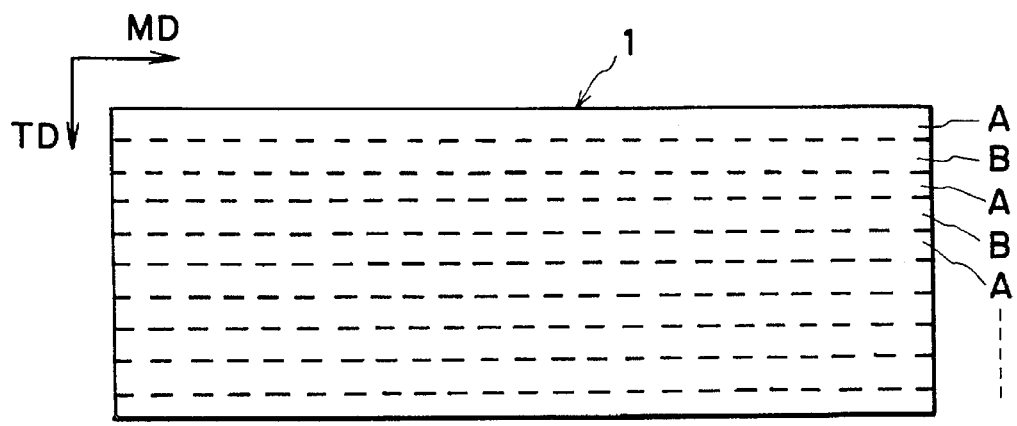
FIG. 2D is a schematic plan view of the resin film.

As a result of our further investigation, the laminate resin film 1 has been found to have a surface stripe pattern as shown in FIG. 2D wherein the resin layers A and B are exposed to both major surfaces 1a and 1b to form the stripe pattern including the stripes of the resins A and B arranged in a prescribed order (alternately in this embodiment). Such a stripe pattern has been confirmed by different surface properties, inclusive of, e.g., different degrees of affinity to water (i.e., hydrophilicity and hydrophobicity) which may be useful to provide a (locally) fog-free surface, different degrees of dyeability which may be useful for providing a surface having a dyed stripe pattern, and different degrees of adhesiveness with another material, such as resin, attributable to the properties of the exposed resins A and B.

In the above, a description has been made to an alternate lamination structure of two resin species A and B (A/B/A/B/A/B . . . ). However, the order of the lamination can be arbitrarily selected, inclusive of repetition, such as A/B/B/A/B/B/A . . . or A/B/B/A/A/B/B/A . . . , e.g., for such two resins A and B. In order to provide a laminate resin film having a uniform property as a whole, it is preferred to form a laminated resin product having a constant order of repetitive lamination. It is of course possible to form a laminate including three or more resin species. For example, three resin species A, B and C may be laminated, e.g., as follows:

A/B/C/A/B/C/A . . . ,
A/B/C/B/A/B/C/B/A . . . ,
A/B/A/B/C/A/B/A/B/C . . . ,
A/B/C/B/A/B/C/B/A . . .

Generally in consideration of an inflation process using a spiral die as a preferred production process, the plurality (n, a positive integer ≧2) of mutually different resin species for lamination may preferably be 2–4. On the other hand, the number (m, a positive integer satisfying n<m) of spiral grooves, i.e., the total number of spiral grooves 24a, 24b, etc. (described hereinafter), may preferably be 4–256, further preferably 8–128, particularly preferably 16–64. Further, the number of thicknesswise laminated layers at a particular planar position of the laminate resin film may preferably be 4–100 layers, particularly 6–20 layers. The number of thicknesswise laminated layers may be calculated as m×ω/360 from the above-mentioned number of spiral grooves m and spreading angle ω. The total thickness of the laminate resin product or laminated resin film may be controlled in a wide range, e.g., by using a melt-extruded parison as it is or controlling the degree of inflation (stretching ratio), and may for example be in the range of 10 μm–1 mm, preferably 15–200 μm. Further, it is also preferred in many cases to coat at least one of the two major surfaces of an obliquely laminated resin film as shown in FIGS. 2A–2C with at least one layer of a resin species which is identical to or different from the resin species constituting the laminated resin film.

Next, an outline of the inflation process using a spiral die as a preferred process for producing the laminate resin product (which process per se is a subject of an application concurrently filed with this application entitled "SPIRAL DIE AND LAMINATE PRODUCTION METHOD USING SAME") will be described.

Figures 3A, 3B:
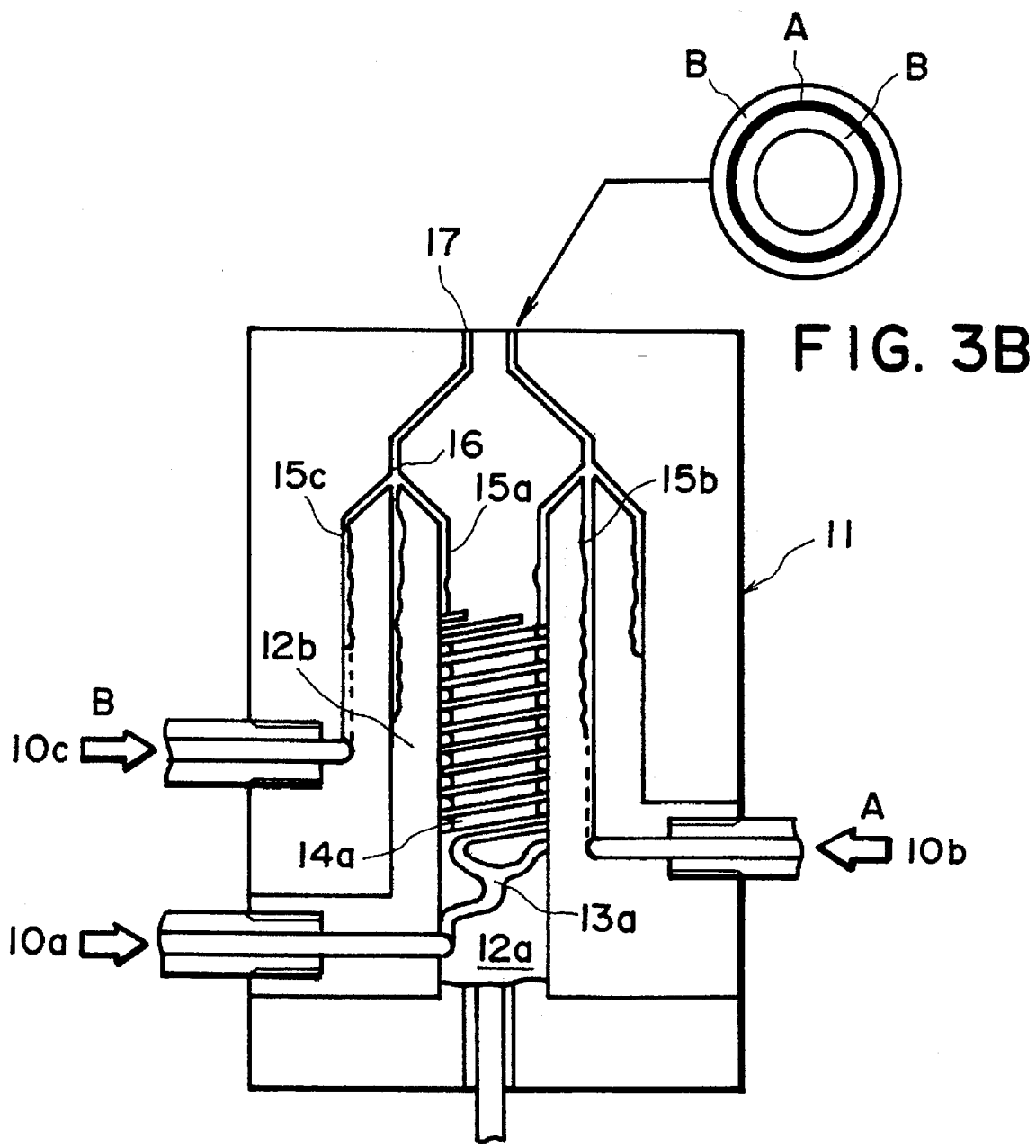
FIG. 3A is a longitudinal sectional view of a conventional multi-layer spiral die and FIG. 3B is a cross-sectional view of a product film obtained therefrom.

For comparison, a process using a spiral die for multi-layer laminate will be first described with reference to FIG. 3A, which is a schematic longitudinal sectional view of a conventional spiral die for laminate production. Referring to FIG. 3A, a resin B extruded from an extruder 10a (not illustrated) and introduced into a spiral die 11 is guided to a so-called (reverse) tournament-form manifold 13a (only one of a plurality thereof being shown) disposed in proximity with the outer periphery of a first die ring (innermost ring) 12a where the resin B is uniformly diverged and introduced into a plurality of spiral (flow) grooves 14a disposed on the outer periphery of the first die ring 12a. Each spiral groove has a depth which gradually decreases as it goes in the proceeding direction (generally upward). The resin B flowing along the spiral groove 14a spirally proceeds upwards while forming an overflowing or leakage stream at a spacing from a second die ring 12b until it flows upwards as a uniform axial tubular stream along a groove-free tubular path 15a to reach a joining point 16. On the other hand, a resin A extruded from an extruder 10b and introduced into the spiral die 11 is similarly diverged and caused to form an overflowing or leakage stream to consequently form a uniform axial tubular stream flowing through a tubular path 15b and reach the joining point 16. Further, a melted resin stream B extruded from an extruder 10c similarly is diverged, forms an overflowing or leakage stream and then forms a uniform axial tubular stream flowing through a tubular path 15c to reach the joining point 16. Then, at the joining point 16, these three tubular streams of melted resins B, A and B are laminated to be extruded through a die lip 17 to form a laminate tube. The laminate tube thus extruded out of the die lip 17 forms a laminated tubular product having a cross-section as shown in FIG. 3B and comprising an intermediate layer of resin A (e.g., a gas-barrier resin) sandwiched with layers of resin B (e.g., an adhesive and stretchable resin).

Figure 4B:
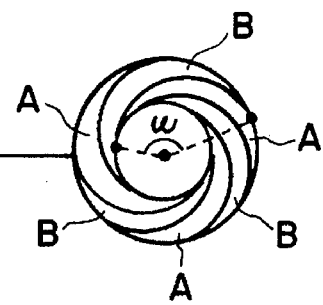
FIG. 4B is a schematic circumferentially cross-sectional view of a product film obtained therefrom.
Figure 4A:
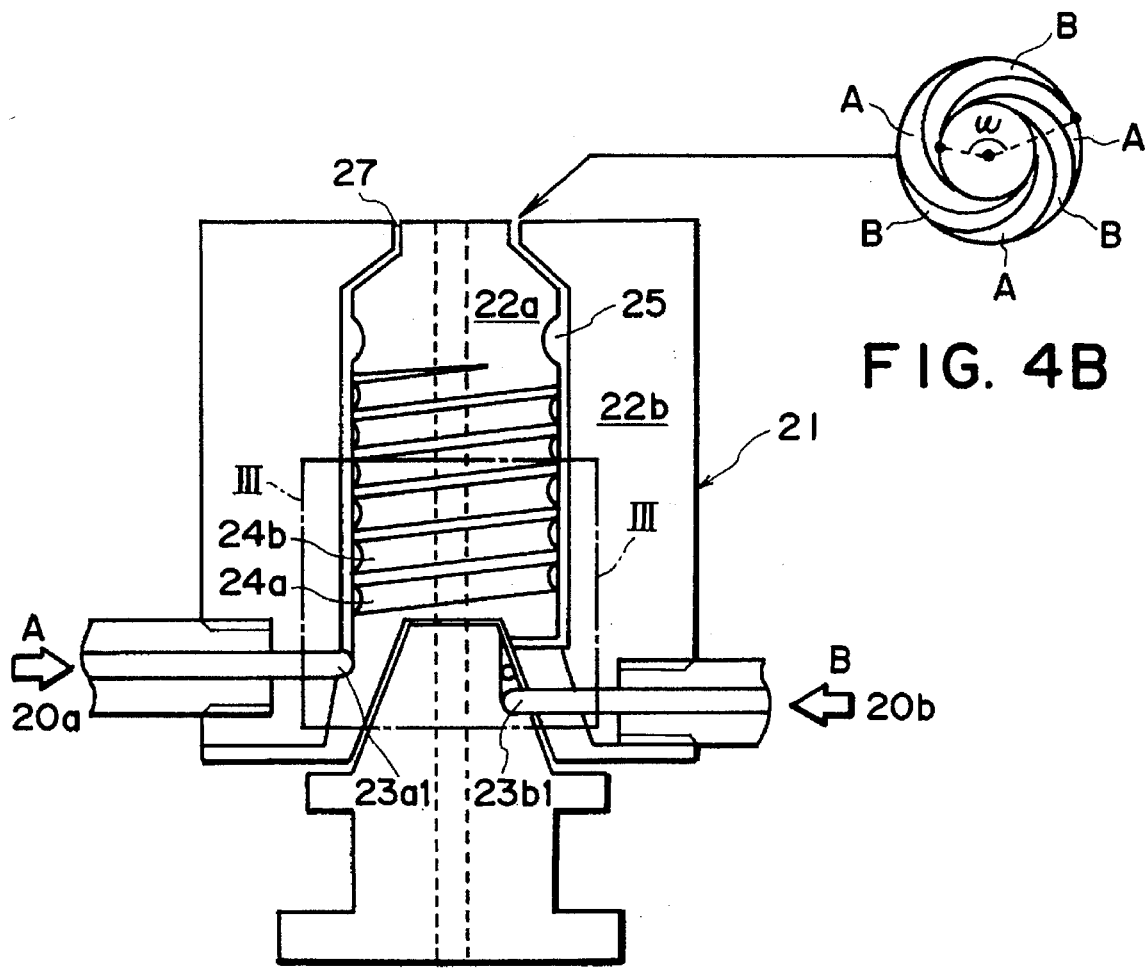
FIG. 4A is a longitudinal sectional view of a spiral die suitable for production of a laminate resin film according to the present invention.

In contrast thereto, FIG. 4A is a schematic sectional view of a spiral die 21 preferably used for producing a laminate resin product of the present invention. Streams of melted resins A and B extruded out of extruders 20a and 20b and introduced into the spiral die 21 are respectively diverged through (reverse) tournament-form manifolds (not shown but described hereinafter) each per se being similar to the one denoted by reference numeral 13a shown in FIG. 3A and introduced into respective spiral grooves 24a and 24b each provided in a plurality. These melted resin streams A and B are then caused to flow along these spiral grooves as spiral streams accompanied with an overflowing stream and upwards through a single tubular path between an inner die ring 22a and an outer die ring 22b where the melted resin streams A and B are alternately laminated obliquely to flow through a groove-free tubular path 25 to be extruded through a die lip 27. The thus-extruded laminate tube forms a laminated tubular product having a circumferential cross-section (i.e., a cross-section in a transverse direction (TD) perpendicular to the extrusion axis) schematically as shown in FIG. 4B wherein layers of the resin A and B are alternately laminated obliquely to the two major surfaces.

Figure 5:
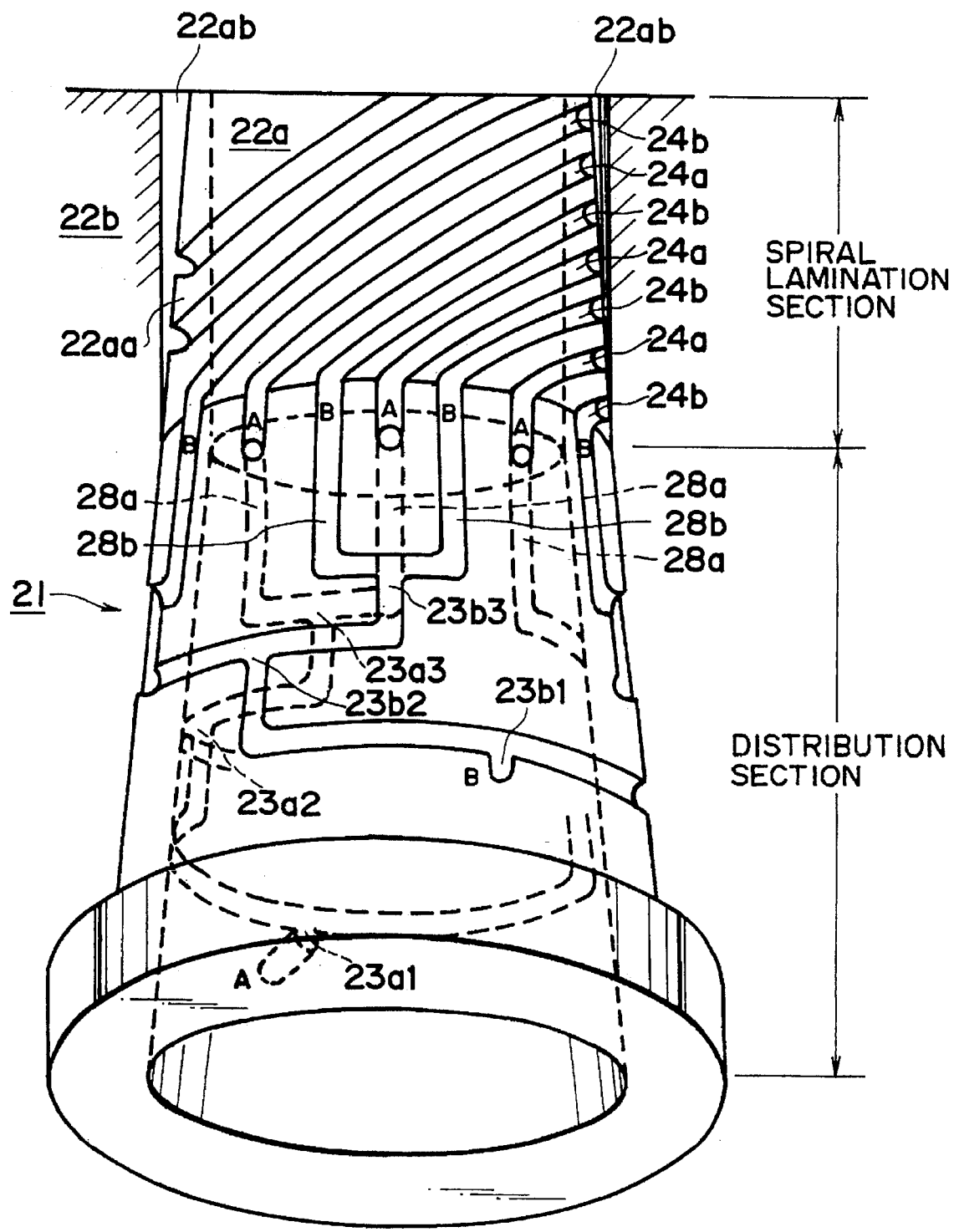
FIG. 5 is a schematic perspective enlarged illustration of an essential part of the spiral die shown in FIG. 4A.

FIG. 5 is a schematic perspective view of a part enclosed within a frame III drawn with a dot-and-dash line in FIG. 4A for illustrating the manner of distribution-lamination of the melted resin streams A an B. Referring to FIG. 5, the melted resin streams A and B extruded out of the extruders (20a and 20b in FIG. 4A) and introduced into the spiral die 21 first reach tournament manifold points 23a1 and 23b1, from which the melted resin stream A and B are repeatedly diverged through manifold points 23a2, 23b2 . . . and flow through final manifold points 23a3 and 23b3 to be introduced into final paths 28a, 28b, 28a, 28b . . . in a distribution section. From the final paths 28a, 28b . . . , the melted resin streams A and B are caused to alternately flow into spiral grooves 24a, 24b, 24a, 24b . . . . Incidentally, the initial points of the spiral grooves 24a, 24b, 24a, 24b . . . (i.e., the terminal points of the final paths 28a, 28b, 28a, 28b . . . in the distribution section) may preferably be disposed substantially on an identical circular circumferential line on the inner die ring 22a. The melted resin streams A and B having entered the spiral grooves 24a and 24b initially exclusively proceed as spiral streams along the spiral grooves 24a and 24b but gradually form leakage streams overflowing spiral ridges 22aa of the inner die ring 22a and flow upwards in a path 22ab between the inner die ring 22a, particularly the spiral ridges 22aa thereof, and the outer die ring 22b. In other words, the melted resin streams A and B overflow out of the respective spiral grooves as if they form melted films flowing circumferentially. Then, the thus-formed flowing films of melted resins A and B are laminated to overlie the flowing films of melted resins B and A issued from the spiral grooves 24b and 24a, respectively, at the downstream side, i.e., so that the flowing films A and B alternately overlie each other to be laminated with each other. The angle of the lamination coincides with a spreading angle ω (FIG. 4B) of each resin stream overflowing out of each spiral groove. More specifically, each resin stream forms an outer surface portion of the product laminate tube at the initial point of an associated spiral groove and gradually proceed toward the inner surface while being laminated or covered with other resin stream to reach the inner surface when it moves by the spreading angle ω. Thus, each of the melted resin steam A and B is laminated obliquely for a spreading angle ω (FIG. 4B). The spreading angle ω can be controlled for each of the resins A and B by changing the initial depth, gradual thickness-reducing rate, etc., of the spiral groove 24a or 24b but may be in the range of generally 60–720 degrees, preferably 80–360 degrees, more preferably 130–230 degrees. In case where the spreading angle ω is below 60 degrees, the resultant laminate is liable to be accompanied with a thickness irregularity. On the other hand, above 720 degrees, the pressure in the spiral die at the time of the forming is liable to be excessive, so that the forming of the laminate becomes difficult.

Referring again to FIG. 4A, the laminate tube extruded out of the die lip 27 may be optionally subjected to an inflation step for circumferentially enlarging and thinning the laminate and then shaped into a laminate resin film as shown in FIGS. 2A–2D according to the present invention by slitting the tubular laminate ordinarily in a direction parallel to the forming axis.

In the above, an outline of the inflation process using a spiral die as a preferred process for producing the laminate resin product according to the present invention has been described. However, the laminate resin product according to the present invention can be prepared by another process than the above-described one. For example, it is possible to use a process of alternately applying or casting coating liquids of the resins A and B in a mold slightly inclined as desired, while gradually shifting the planar positions of the application; or a process of alternately laminating a resin A film and a resin B film which have been prepared separately through, e.g., the Langmuir-Blodgett technique (LB technique) with an intermediate layer as desired while gradually shifting the planar positions of the lamination. According to necessity, the resultant laminate resin film may be stretched under heating or without heating to reduce the whole thickness and increase the intimate adhesion between the layers.

Now, a gas-barrier laminate resin film as a preferred embodiment of the laminate resin product according to the present invention will be described.

The gas-barrier laminate resin film comprises an alternate laminate as shown in FIGS. 2A–2D of a saponified product of ethylene-vinyl ester copolymer (hereinafter referred to a "EVOH") as a resin A and an adhesive resin of modified polyolefin as a resin B. The gas-barrier laminate resin film may preferably be produced through the above-mentioned inflation process using a spiral die.

The vinyl ester constituting EVOH may preferably be vinyl acetate for example. The ethylene content in EVOH may preferably be 20–60 mol. %, particularly 32–48 mol. %. Below 20 mol. %, EVOH is liable to have a poor melt-formability and above 60 mol. %, the gas-barrier property is liable to be insufficient. EVOH may preferably have a saponification degree of at least 90%. Below 90%, EVOH is liable to have insufficient gas-barrier property and thermal stability. EVOH may preferably have a melt viscosity (at 200° C., 25 sec$^{-1}$) of 100–5000 Pa.s, more preferably 300–2000 Pa.s, further preferably 400–1200 Pa.s.

To EVOH, it is possible to add a plasticizer, a thermal stabilizer, an ultraviolet absorber, an antioxidant, a colorant, a filler, another resin (such as polyamide, polyester, ethylene-vinyl carboxylate copolymer, or ethylene-acrylate copolymer) within an extent of not adversely affecting the performance of EVOH.

The modified polyolefin may preferably comprise a graft copolymer obtained by grafting a polyolefin which may be homopolymer or copolymer of olefin, such as low-density polyethylene, linear low-density polyethylene, linear very low-density polyethylene, polypropylene, ethylene-propylene copolymer containing 2–5 wt. % of ethylene, or ethylene-vinyl acetate copolymer containing 5–45 wt. % of vinyl acetate, with a carboxylic group-containing monomer, such as an unsaturated carboxylic acid or a carboxylic anhydride, or a mixture of such a graft copolymer. Suitable example of the carboxylic group-containing monomer grafted onto the polyolefin may include: unsaturated carboxylic acids and carboxylic anhydrides, such as maleic anhydride, citraconic anhydride, fumaric acid, acrylic acid, methacrylic acid, glycidyl acrylate, hydroxymethacrylate, derivatives of these and mixtures of these. Among these grafting monomers, maleic anhydride is most preferred. Ordinarily, the grafting monomer may be used in an mount of ca. 0.1–10 wt. %, preferably 0.5–5 wt. %, of the polyolefin inclusive of olefin homopolymer and copolymer before the grafting.

Other examples of the modified polyolefin may include: ethylene-acrylic acid copolymer having an acrylic acid content of 5–20 wt. %, ethylene-methacrylic acid copolymer having a methacrylic acid content of 5–20 wt. %, and ethylene-acrylic acid-maleic anhydride copolymer containing 5–20 wt. % of acrylic acid and below 5 wt. % of maleic anhydride.

The modified polyolefin may preferably have a melt viscosity (at 200° C., 25 sec$^{-1}$) of 100–5000 Pa.s, more preferably 300–2000 Pa.s, further preferably 400–1200 Pa.s.

In the case of forming an alternate obliquely laminated resin product by using the above-mentioned preferable spiral die, it is preferred that EVOH and the modified polyolefin are introduced into the spiral die at a volume ratio of 1:0.05–1:20, more preferably 1:0.3–1:3, further preferably 1:0.6–1:1.5. The above-mentioned volume ratio is preferred in the case where the spiral groove for EVOH and the spiral groove for the modified polyolefin have identical depths and identical widths at both their initial points and terminal points and can be changed when the spiral grooves are designed based on different parameters inclusive of those mentioned above.

EVOH and the modified polyolefin introduced into the spiral dies may preferably have similar melt viscosities. For example, in the case where the spiral grooves for EVOH and the modified polyolefin have mutually substantially equal depths and widths at both their initial points and terminal points, these resins may preferably have a melt viscosity ratio (at 200° C., 25 sec$^{-1}$) in the range of 1:0.5–1:2.0, more preferably 1:0.6–1:1.5, particularly preferably 1:0.7–1:1.3. The optimum melt viscosity ratio described above can be changed by changing the processing temperature and the spiral groove design parameters, such as the depths and widths of the spiral grooves.

The resins supplied to the spiral die may be extruded through dies at temperatures which are preferably in the range of 190°–280° C. Below 190° C., the extrusion becomes difficult, and above 280° C., the thermal stabilities can possibly be problematic.

The laminate resin product according to the present invention can assume a multi-layer structure including one or more additional layers on the inner side and/or the outer side (based on a product obtained by a spiral die as described above) of an alternate obliquely laminated resin product (hereinafter simply called "oblique laminate") of EVOH (A)/modified polyolefin (B) having a structure as illustrated in FIGS. 2A–2D.

Layer structure examples of such multi-layer laminate resin product may include those shown below.

| Outer side | Inner side |
| --- | --- |
| C // oblique laminate | |
| oblique laminate | // C |
| oblique laminate | // D // C |
| C // oblique laminate | // C |
| C // oblique laminate | // D // C |
| D // oblique laminate | // C |
| E // oblique laminate | // C |
| C // D // oblique laminate | // C |

In the above, C represents an olefin resin layer; D, a polyamide resin layer; E, a polyester resin layer; and //, an adhesive resin layer. In the case of providing C resin layers both on the inner side and the outer side, these layers can comprise either different species or the same species of olefin resin.

Among the above-mentioned layer structure examples, particularly effective ones are shown below together with their excellent properties. C // oblique laminate // C: high shrinkability, softness, water vapor-barrier property, post-processability. C // oblique laminate // D // C: high shrinkability, high strength, water vapor-barrier property, post-processability. E // oblique laminate // C: high shrinkability, gloss, water vapor-barrier property, post-processability.

C // D // oblique laminate // C: high shrinkability, high strength, water vapor-barrier property, post-processability.

In the above-enumerated structures, the olefin resin layer (C) is disposed principally for providing a heat sealability and a water vapor-barrier property and may comprise any polyolefin inclusive of olefin homopolymer and olefin copolymer. Suitable examples of the resin may include: ethylene-vinyl ester copolymers, such as ethylene-vinyl acetate copolymer (EVA); copolymers of ethylene and a monomer selected from aliphatic unsaturated carboxylic acids and unsaturated carboxylic acid esters, such as acrylic acid, a acrylic acid esters, methacrylic acid, and methacrylic acid esters; ionomer resins; linear low-density polyethylene (LLDPE), mixture of LLDPE and EVA, linear very low-density polyethylene (VLDPE) having a density of at most 0.91 g/cm$^3$ and a Vicar softening point (according to ASTM D-1524) of at most 95° C., preferably at most 85° C., mixture of VLDPE with a minor amount of LLDPE, and mixture of crystalline propylene-ethylene copolymer and polypropylene-based elastomer.

EVA may preferably have a vinyl acetate content of 5–30 wt. %. LLDPE may preferably comprise a copolymer of ethylene with a minor amount of an α-olefin having 4–18 carbon atoms, such as butene-1, pentene-1, 4-methylpentene-1, hexene 1 or octene-1 having a crystalline melting point of 118°–125° C. The ionomer resin may preferably be a resin prepared by neutralizing an anionic portion of a copolymer of an α-olefin such as ethylene or propylene and an unsaturated carboxylic acid such as acrylic acid, methacrylic acid or maleic acid, or a saponified copolymer obtained by partially saponifying a copolymer of such an α-olefin and an unsaturated carboxylic acid ester, with an ion of metal, such as Na, K, Mg, Ca or Zn. Ordinarily, Na or Zn ion is used.

The polyamide resin layer (D) is disposed to provide a tensile strength and an impact strength. Examples of the resin may include: copolymers of two or more species of monomers constituting nylon 6, nylon 9, nylon 11, nylon 12, nylon 66, nylon 69, nylon 611 and nylon 612; nylon 6, nylon 9, nylon 11, nylon 12, nylon 66, nylon 69, nylon 611, and nylon 612. It is also preferred to use an aromatic polyamide resin (such as nylon MXD6, nylon 6I-6T, or nylon 6I) having a better gas-barrier property than the above polyamide resin, or a copolymer or a melt-blend of such an aromatic polyamide resin with the above-mentioned polyamide resin.

The polyester resin layer (E) is disposed to provide a strength and a gloss and may for example comprise polyethylene terephthalate.

The adhesive resin layer (//) is inserted to provide an intimate bonding between the respective layers and the material therefor need not be particularly limited if such requirement is satisfied. Generally preferred examples of the adhesive resin may include: olefin homopolymers or copolymers grafted with an unsaturated carboxylic acid or a carboxylic anhydride, ethylene-acrylic acid copolymer having an acrylic acid content of 5–20 wt. %, ethylene-methacrylic acid copolymer having a methacrylic acid content of 5–20 wt. %, and ethylene-acrylic acid-maleic anhydride copolymer containing 5–20 wt. % of acrylic acid and below 5 wt. % of maleic anhydride.

The oblique laminate or multi-layer laminate resin product prepared in the above-described manner may have a thickness of, e.g., 20–600 μm but, as desired, may preferably be stretched at a stretch ratio of at least 1.5 in at least one axial direction by inflation or by using a tenter to form a stretched film having a thickness of, e.g., 10–200 μm. The heating temperature for the stretching may preferably be at least 60° C., which is a glass transition temperature of EVOH.

The portion of the oblique laminate in the resultant multi-layer stretched film may preferably have a thickness of 4–180 μm, particularly 6–100 μm, and the EVOH layers in the oblique laminate may preferably have a total thickness of 2–100 μm, particularly 4–50 μm. The lower limits are set so as to ensure a necessary gas-barrier property. As a result, it is possible to have a laminate resin film desirably having an oxygen gas-barrier property (oxygen permeability) of at most 500 cm$^3$/m$^2$0.24 h.atm (under 30° C. and 100% RH (relative humidity)) and a water vapor-barrier property (permeability) of at most 50 g/m$^2$0.24 h (under 40° C. and 90% RH).

Hereinbelow, some Examples and Comparative Examples of producing gas-barrier laminate resin films will be described.

EXAMPLE 1

A 5-layer spiral die was provided by replacing a core layer (3rd layer)-forming die part in an ordinary 5-layer spiral die for inflation with a spiral die (m=32) for forming an oblique laminate capable of alternately introducing and processing two (species of) resins as shown in FIG. 4A. By using the 5-layer spiral die, all the respective resin layers were extruded simultaneously and coaxially into a tubular form, thereby forming a multi-layer non-stretched film including an oblique laminate as the core layer as an embodiment of the laminate resin product according to the present invention. The nonstretched tubular film was stretched thereafter by inflation to obtain a multi-layer stretched film including an oblique laminate as a core layer. The production conditions are summarized in Tables 1 and 2 appearing hereinafter.

The stretched film had the following internal lamination structure:

| Layer | IO/Adhesive/oblique laminate/Adhesive/EVA | | | | |
|---|---|---|---|---|---|
| Thickness (μm) | 43 | 2.5 | 20 | 2.5 | 23 |

The oblique laminate as the core layer included core layers (1) of EVOH in a total thickness of 10 μm and core layers (2) of Adhesive resin 1 in a total thickness of 10 μm and included 14–15 layers in its thicknesswise direction. The resins included were as follows.

IO: Innermost component layer of ionomer resin ("HI-MILAN AM79082", mfd. by Mitsui Dupont Polychemical K.K.; melt index (190° C., 2160 g-wt.)=1.9 g/10 min.).

EVA: Outermost component layer of ethylene-vinyl acetate copolymer having a vinyl acetate content of 15 wt. % ("NUC3753", mfd. by Nippon Unicar K.K.; melt index (190° C., 2160 g-wt.)=1.5 g/10 min.).

Adhesive: An adhesive layer of EVA copolymer modified by grafting with maleic anhydride ("MODIC E-300K", mfd. by Mitsubishi Yuka K.K.; melt viscosity (200° C., 25 sec$^{-1}$)=708 Pa.s).

Adhesive resin 1: The same as the resin of Adhesive.

EVOH: Saponified ethylene-vinyl acetate copolymer having an ethylene content of 44 mol. %, a saponification degree of 99.4%, and a melt viscosity (200° C., 25 sec$^{-1}$) of 901 Pa.s ("EVAL EPE-105", mfd. by Kuraray K.K.).

Some representative physical and mechanical properties of the non-stretched film and the stretched film are shown in Table 3 appearing hereinafter.

Incidentally, the die for forming the oblique laminate as the core layer (3rd layer) in the modified 5-layer spiral die had the following features:

<Die>

| | | |
|---|---|---|
| Number of spiral grooves | 32 (= 16 + 16) | |
| Number of spiral turns | 1 | |
| Spiral pitch | 5.156 mm | |
| Spiral pitch angle | 27.7 deg. | |
| Depth and width of spiral grooves: | | |
| | depth (mm) | width (mm) |
| For EVOH initial | 5 | 3.5 |
| terminal | 0 | 0 |
| For initial | 5 | 3.5 |
| Adhesive terminal | 0 | 0 |
| resin 1 | | |
| Gap between a spiral ridge (on the inner die ring) and the outer die ring: | | |
| initial | 0.5 mm | |

| | |
|---|---|
| terminal | 1.25 mm |
| Diameter of the inner die ring: | |
| initial | 100 mm |
| terminal | 97.5 mm |

<Measurement method>

The respective properties referred to herein are based on values measured in the following manner.

1. Tensile strength, Yield stress and Elongation

These properties were measured by using a universal testing machine ("Tensilon RTM-100", mfd. by Orientec K.K.) according to JIS K-7127 under the following conditions.

| | |
|---|---|
| Sample length (gripper span) | 50 mm |
| Sample width | 10 mm |
| Crosshead speed | 500 mm/min |
| Test temperature | 23° C. |
| Test humidity | 50% RH |

The tensile strength and elongation represent measured values at the rupture.

2. Shrinkage in hot water

At least 5 pairs of 10 cm-distant points were marked for each of MD and TD directions on a stretched sample film, and the sample film dipped in hot water at a prescribed temperature (shown in Tables 3 and 4 appearing hereinafter) for 10 sec. Immediately after taking out the sample film, the sample film was cooled in water at room temperature. Then, the distance between each pair of marked points was measured, and a subtraction of the measured distance from the original 10 cm was expressed in percentage as a shrinkage. The values indicated in Table 1 are respectively an average of at least 5 values measured in this manner.

3. Young's modulus of elasticity

Measured by using a universal testing machine ("Tenslion RTM-100", mfd. by Orientec K.K.) according to JIS K-7127 under the following conditions.

| | |
|---|---|
| Sample length (gripper span) | 100 mm |
| Sample width | 20 mm |
| Crosshead speed | 10 mm/min |
| Test temperature | 23° C. |
| Test humidity | 50% RH |

4. Oxygen permeability

Measured by using an oxygen gas permeability apparatus ("Oxtran 100", mfd. by Modern Control Co.) according to JIS K-7126 under the following conditions.

| | |
|---|---|
| Test temperature | 30° C. |
| Test humidity | 100% RH |

5. Melt-viscosity

Measured by using a rotating viscometer ("DSR", mfd. by Rheometrics Co.) under the following conditions.

| | |
|---|---|
| Test temperature | 200° C. |
| Shear rate | 0.1–1000 sec$^{-1}$ |
| Geometry | parallel plates |
| Gap | 2 mm |

The melt-viscosity value and its ratio described herein were calculated at a shear rate of 25 sec$^{-1}$ based on the above-measurement.

6. Melt index

Measured according to JIS K7120 at a temperature of 190° C. and under a load of 2160 g.

EXAMPLE 2

A non-stretched film and a stretched film were prepared in the same manner as in Example 1 except for using Adhesive resin 2 (a linear very low-density polyethylene resin ("SE800", mfd. by Mitsui Sekiyu Kagaku K. K.; melt viscosity (200° C., 25 sec$^{-1}$)=1147 Pa.s)) in place of Adhesive resin 1 constituting the oblique laminate. The properties of the resultant films are shown in Table 3.

EXAMPLE 3

A spiral die (m=16) for forming an oblique laminate capable of alternately introducing and processing two resins as shown in FIG. 4A was used to effect a simultaneous tubular extrusion to form a laminate tube. The laminate tube was then subjected to biaxial stretching by the inflation method to obtain a multi-layer stretched film. The stretched film was composed of an oblique laminate comprising totally 6 μm-thick layers of EVOH and totally 12 μm thick layers of EMAA and including totally 6–7 laminated layers in its thicknesswise direction, wherein EVOH was the same as the one used in Example 1, and EMAA was ethylene-methacrylic acid copolymer ("1207C", mfd. by Mitsui DuPont Polychemical K.K.; methacrylic acid content=12 wt. %, melt-viscosity (at 200° C., 25 sec$^{-1}$)=450 Pa.S).

Some representative physical properties and mechanical properties of the thus-obtained film are shown in Table 4 appearing hereinafter.

The spiral die for oblique laminate formation used in Example 3 had the following features.

<Spiral Die>

| | | | |
|---|---|---|---|
| Number of spiral grooves | | 16 (=8 + 8) | |
| Number of spiral turns | | 1.5 | |
| Spiral pitch | | 6.875 mm | |
| Spiral pitch angle | | 19.3 deg. | |
| Depth and width of spiral grooves: | | | |
| | | dept mm | width (mm) |
| For EVOH | initial | 10 | 5 |
| | terminal | 0 | 0 |
| For EMAA | initial | 6.5 | 5 |
| | terminal | 0 | 0 |
| Gap between a spiral ridge (on the inner die ring) and the outer die ring: | | | |
| | initial | 0 mm | |
| | terminal | 1.5 mm | |
| Diameter of the inner die ring: | | | |
| | initial | 100 mm | |
| | terminal | 97 mm | |

COMPARATIVE EXAMPLE 1

A five-layer tube was formed by simultaneous extrusion through an ordinary five-layer spiral die and then simultaneously stretched biaxially according to the inflation method to provide a five-layer stretched film for comparison with those of Examples 1 and 2 above. The production conditions are shown in Tables 1 and 2. The resultant stretched film had the following lamination structure.

| | IO/Adhesive/EMAA/EVOH/Adhesive/EVA | | | | | |
|---|---|---|---|---|---|---|
| Thickness (μm) | 43 | 7.5 | 7.5 | 10 | 7.5 | 23 |

The used resins are the same as these used in Example 1 above.

The measured properties of the stretched laminate film are also shown in Table 3 appearing hereinafter.

COMPARATIVE EXAMPLE 2

A three-layer tube was formed by simultaneous extrusion through an ordinary three-layer spiral die and then simultaneously stretched biaxially according to the inflation method to provide a three-layer stretched film for comparison with the one of Example 3 above. The resultant stretched film had the following lamination structure.

| | EMAA/EVOH/EMAA | | |
|---|---|---|---|
| Thickness (μm) | 6 | 6 | 6 |

The used resins of EVOH and EMAA are the same as those used in Examples 1 and 3, respectively.

The measured properties of the stretched laminate film are also shown in Table 4 appearing hereinafter.

COMPARATIVE EXAMPLE 3

The procedure of Example 1 for forming a laminate resin film was repeated except for using Adhesive resin 3 (a styrene-ethylene-butadiene-styrene copolymer resin (SEBS) modified by grafting with maleic anhydride ("M-1943", mfd. by Asahi Kasei K.K.; melt viscosity (200° C., 25 sec$^{-1}$)=1809 Pa.s)) in place of Adhesive resin 1 constituting the oblique laminate. As a result, the two resins were mixed in the core layer and failed to show an oblique laminate structure. The results are summarized in Table 5 appearing hereinafter together with those of Examples 1 and 2 (re-indicated).

TABLE 1

| | Film production conditions (Extrusion step) | | | | | | | |
|---|---|---|---|---|---|---|---|---|
| | Extruder set temp. (°C.) | | | | | Die set temp. (°C.) | | |
| | C1 | C2 | C3 | C4 | AD | D1 | D2 | D3 |
| Outermost layer | 170 | 180 | 190 | 190 | 190 | 200 | 200 | 200 |
| Core (1) | 180 | 190 | 210 | 210 | 200 | | | |
| Core (2) | 180 | 190 | 210 | 210 | 200 | | | |
| Innermost layer | 170 | 190 | 190 | 190 | 190 | | | |
| Adhesive | 150 | 170 | 185 | — | 190 | | | |

Die outlet resin temperature: 204° C.

TABLE 2

Film production conditions (stretching step) and Film internal structure

|  | Comp. Ex. 1 | Ex. 1 | EX. 2 |
|---|---|---|---|
| Structure (thickness μm) | | | |
| Outermost layer | EVA (23) | EVA (23) | EVA (23) |
| Core (1) *1 | EVOH (10) | EVOH (10) | EVOH (10) |
| Core (2) *1, *2 | — | A.V.-EVA (10) | A.V.-VLDPE (10) |
| Innermost layer | IO (43) | IO (43) | IO (43) |
| Adhesive layer *2 | A.M.-EVA (7.5 × 2) | A.M.-EVA (2.5 × 2) | A.M.-EVA (2.5 × 2) |
| Total thickness (μm) | 91 | 91 | 91 |
| Stretching method | Inflation | Inflation | Inflation |
| Stretch temp. (°C.) | 82 | 82 | 82 |
| Stretch ratio | MD 3.1 | MD 3.1 | MD 3.1 |
|  | TD 2.5 | TD 2.5 | TD 2.5 |
| Number of laminated layers in core |  | 14–15 | 14–15 |
| Melt viscosity ratio between two core resins (Core (1):Core (2)) |  | 1:0.88 | 1:1.22 |
| Volume ratio between two core resins |  | 1:1 | 1:1 |
| Spreading angle (ω°) |  | 160 | 160 |
| θ (deg.) in FIG. 2C |  | 0.003 | 0.003 |

Note:
*1: The sum of Core (1) and Core (2) provide the thickness of the oblique laminate.
*2: "A.M.-" represents "acid-modified".

TABLE 3

Physical-Mechanical Properties of non-stretched film (NSF) and stretched film (SF)

|  |  |  | Comp. Ex. 1 | Ex. 1 | Ex. 2 |
|---|---|---|---|---|---|
| Thickness (μm) |  |  | 91 | 91 | 91 |
| Stretching method |  |  | Inflation | Inflation | Inflation |
| Stretch temp. (°C.) |  |  | 82 | 82 | 82 |
| Stretch ratio |  |  | MD 3.1 | MD 3.1 | MD 3.1 |
|  |  |  | TD 2.5 | TD 2.5 | TD 2.5 |
| Tensile strength (MPa) | SF |  | MD 50 | MD 50 | MD 50 |
|  |  |  | TD 46 | TD 42 | TD 44 |
|  | NSF |  | MD 27 | MD 26 | MD 26 |
|  |  |  | TD 26 | TD 24 | TD 24 |
| Elongation (%) | SF |  | MD 135 | MD 153 | MD 148 |
|  |  |  | TD 168 | TD 169 | TD 168 |
|  | NSF |  | MD 538 | MD 634 | MD 660 |
|  |  |  | TD 534 | TD 561 | TD 649 |
| Shrinkage in hot water (%) | SF | 65° C. | MD 25 | MD 25 | MD 31 |
|  |  |  | TD 27 | TD 29 | TD 34 |
|  |  | 70° C. | MD 34 | MD 37 | MD 39 |
|  |  |  | TD 36 | TD 40 | TD 41 |
|  |  | 75° C. | MD 36 | MD 43 | MD 46 |
|  |  |  | TD 38 | TD 46 | TD 49 |
|  |  | 80° C. | MD 44 | MD 48 | MD 50 |
|  |  |  | TD 43 | TD 55 | TD 51 |
|  |  | 90° C. | MD 44 | MD 51 | MD 52 |
|  |  |  | TD 43 | TD 57 | TD 54 |
|  |  | 100° C. | MD 45 | MD 52 | MD 53 |
|  |  |  | TD 43 | TD 58 | TD 56 |
| Young's modulus (MPa) | NSF |  | MD 184 | MD 166 | MD 174 |
|  |  |  | TD 180 | TD 157 | TD 162 |
|  | SF |  | MD 260 | MD 208 | MD 199 |
|  |  |  | TD 257 | TD 208 | TD 162 |
|  | SF** |  | MD 117 | MD 89 | MD 84 |
|  |  |  | TD 131 | TD 82 | TD 54 |
| Oxygen permeability, SF (cm³/m² · 24 h · atm) |  |  | 140 | 140 | 139 |

**A film obtained after shrinking the stretched film (SF) in hot water at 80° C.

TABLE 4

Physical-Mechanical Properties of non-stretched film (NSF) and stretched film (SF)

|  |  |  | Comp. Ex. 2 | Ex. 3 |
|---|---|---|---|---|
| Structure (thickness μm) |  |  |  |  |
| Resin A |  |  | EVOH (6) | EVOH (6) |
| Resin B |  |  | EMAA (12) | EMAA (12) |
| Total thickness (μm) |  |  | 18 | 18 |
| Number of spiral grooves (m) |  |  |  | 16 |
| Number of laminated layers |  |  | 3 | 6–7 |
| Stretched ratio |  |  | MD 3.0 | MD 3.0 |
|  |  |  | TD 3.0 | TD 3.0 |
| Stretch temp. (°C.) |  |  | 80 | 80 |
| Tensile strength (MPa) | SF |  | MD 30 | MD 25 |
|  |  |  | TD 30 | TD 28 |
| Yield stress (MPa) | SF |  | MD 21 | MD 12 |
|  |  |  | TD 23 | TD 13 |
| Elongation (%) | SF |  | MD 400 | MD 410 |
|  |  |  | TD 390 | TD 440 |
| Shrinkage in hot water (%) | SF | 70° C. | MD 18 | MD 23 |
|  |  |  | TD 18 | TD 23 |
|  |  | 80° C. | MD 28 | MD 34 |
|  |  |  | TD 28 | TD 34 |
|  |  | 90° C. | MD 32 | MD 37 |
|  |  |  | TD 32 | TD 37 |
| Young's modulus (MPa) | NSF |  | MD 522 | MD 360 |
|  |  |  | TD 542 | TD 324 |
|  | SF |  | MD 1110 | MD 944 |
|  |  |  | TD 1180 | TD 910 |
|  | SF** |  | MD 340 | MD 260 |
|  |  |  | TD 343 | TD 243 |
| Oxygen Permeability, SF (cm³/m² · 24 h · atm) |  |  | 220 | 220 |
| Volume ratio between two core resins (EVOH:EMAA) |  |  |  | 1:2 |
| Spreading angle (ω deg.) |  |  |  | 150 |
| θ (deg.) in FIG. 2C |  |  |  | 0.003 |

**A film obtained after shrinking the stretched film (SF) in hot water at 80° C.

TABLE 5

Film production conditions (stretching step) and Film internal structure

|  | Comp. Ex. 3 | Ex. 1 | Ex. 2 |
| --- | --- | --- | --- |
| Structure |  |  |  |
| Outermost layer | EVA | EVA | EVA |
| Core (1) *1 | EVOH | EVOH | EVOH |
| Core (2) *1, *2 | A.M.-SEBS | A.M.-EVA | A.M.-VLDPE |
| Innermost layer | IO | IO | IO |
| Adhesive layer *2 | A.M.-EVA | A.M.-EVA | A.M.-EVA |
| Number of layers in oblique laminate | No layer structure | 14–15 | 14–15 |
| Melt viscosity ratio between two core layers at 200° C., 25 sc.$^{-1}$ (Core (1):Core (2)) | 1:2.18 | 1:0.88 | 1:1.22 |
| Volume ratio between two core resins | 1:1 | 1:1 | 1:1 |

Note:
*1: The sum of Core (1) and Core (2) provide the thickness of the oblique laminate.
*2: "A.M.-" represents "acid-modified".

[Evaluation]

In view of Tables 3 and 4, it is understood that the gas-barrier films of Examples 1–3 including an oblique laminate according to the present invention showed equivalent gas-barrier properties compared with those of Comparative Examples 1–2 in spite of the characteristic oblique laminate obtained through spiral dies of simple structure, particularly with fewer extruders (2 extruders) in case of Example 3 compared with the corresponding Comparative Example 2 using 3 extruders. Further it should be noted that the laminate resin films of Examples 1–3 showed a larger heat-shrinkability and a lower Young's modulus (higher degree of softness) after heat-shrinkage than those of the corresponding Comparative Examples. Accordingly, it is understood that these laminate resin films of the present invention have particularly suitable properties suited as heat-shrinkable gas-barrier film materials.

EXAMPLE 4

A laminate stretched film was prepared in the same manner as in Example 3 except for using nylon 6-12 (a copolymer of nylon 6 and nylon 12 (mol ratio=50:50), "AMILAN CM6514X3", mfd. by Toray K.K.; melt viscosity (200° C., 25 sec$^{-1}$)=814 Pa.s)) in place of EVOH in the oblique laminate.

A 50 vol.% potassium iodide aqueous solution was applied on both surfaces of the laminate film, which was then left standing for 1 min. at room temperature and washed with running water. As a result, one major surface of the laminate film showed regularly arranged ca. 31 mm-wide stripes dyed in brown spaced apart with non-dyed ca. 6.5 mm-wide stripes, and the other major surface showed regularly arranged ca. 3 mm-wide stripes dyed in brown spaced apart with non-dyed ca. 34.5 mm-wide stripes. The boundaries between the dyed and non-dyed stripes were clearly observed.

What is claimed is:

1. An extruded resin laminate, comprising a plurality of resin species and having two major surfaces and a thickness defined between the two major surfaces, wherein layers of said plurality of resin species are laminated parallel to the major surfaces in a section across the thickness in an extruded machine direction and laminated obliquely at an inclination angle of at most 4 degrees with respect to the major surfaces in a section across the thickness in a transverse direction perpendicular to the extruded machine direction, and each layer of said plurality of resin species is exposed to the two major surfaces to form a pattern of surface stripes of said plurality of resin species running parallel to the extruded machine direction.

2. A resin laminate according to claim 1, including 4–100 thicknesswise laminated layers at a planar position thereof.

3. An extruded resin laminate according to claim 2, wherein said plurality of resin species include two resin species having different surface properties.

4. An extruded resin laminate according to claim 3, wherein said two resin species have different degrees of affinity to water.

5. An extruded resin laminate according to claim 3, wherein said two resin species have different degrees of dyeability.

6. An extruded resin laminate according to claim 3, wherein said two resin species have different degrees of adhesiveness.

7. An extruded resin according to any one of claims 3 or 1, wherein the layers of two resin species are laminated obliquely and alternately.

8. An extruded resin laminate according to claim 7, wherein the two resin species comprise a gas-barrier resin and an adhesive resin.

9. An extruded resin laminate according to claim 8, wherein said gas-barrier resin is a saponified product of ethylene-vinyl ester copolymer, and said adhesive resin is a modified polyolefin.

10. An extruded resin laminate according to any one of claims 3 or 1, wherein at least one of said two major surfaces is coated with another resin layer.

11. An extruded resin laminate according to claim 7, wherein at least one of said two major surfaces is coated with another resin layer.

12. An extruded resin laminate according to claim 8, wherein at least one of said two major surfaces is coated with another resin layer.

13. An extruded resin laminate according to claim 9, wherein at least one of said two major surfaces is coated with another resin layer.

* * * * *